No. 631,287. Patented Aug. 22, 1899.
A. EUSTON.
APPARATUS FOR EXTRACTING OIL.
(Application filed Jan. 23, 1899.)
(No Model.)
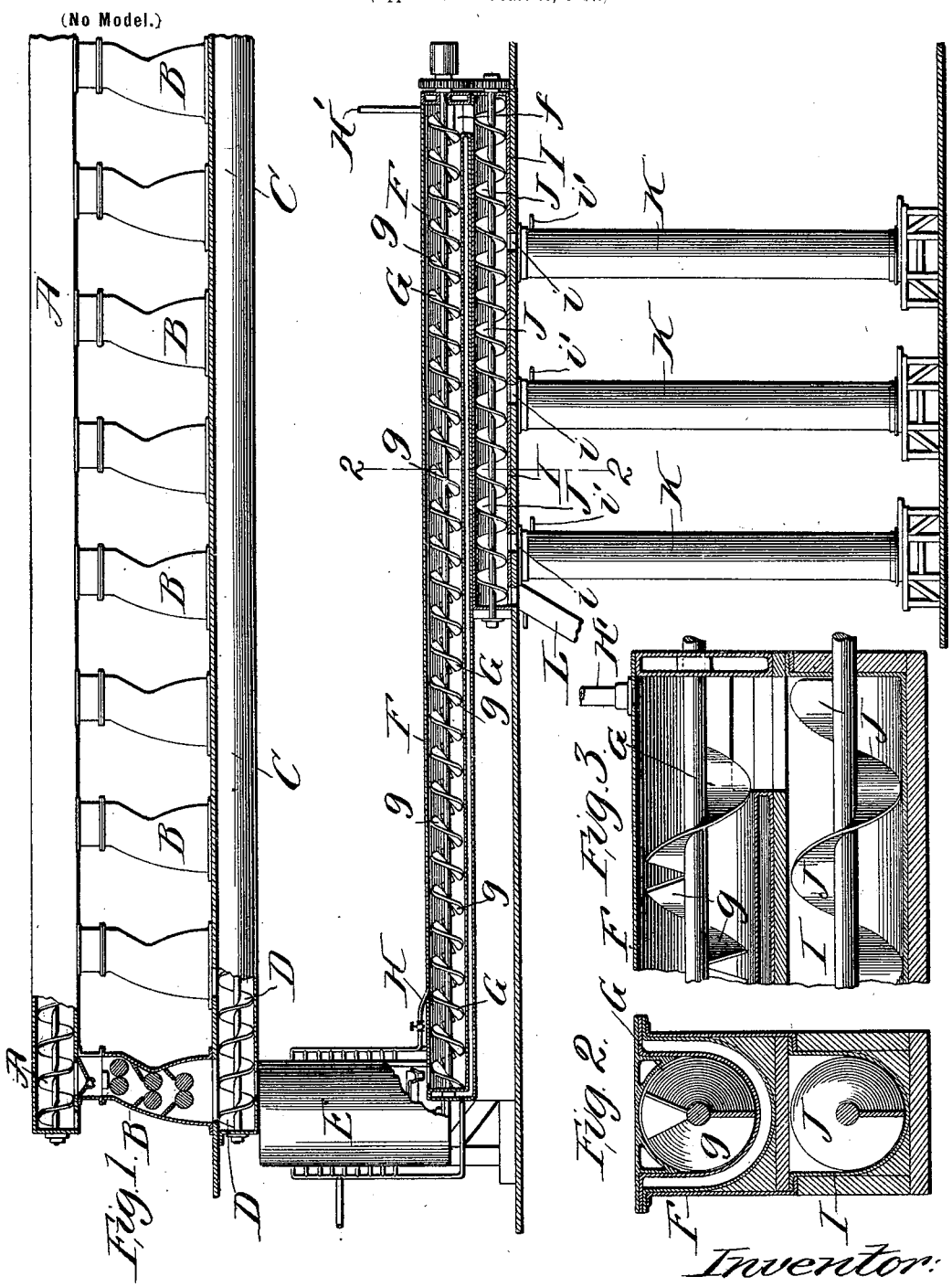

UNITED STATES PATENT OFFICE.

ALEXANDER EUSTON, OF ST. LOUIS, MISSOURI.

APPARATUS FOR EXTRACTING OILS.

SPECIFICATION forming part of Letters Patent No. 631,287, dated August 22, 1899.

Application filed January 23, 1899. Serial No. 703,166. (No model.)

*To all whom it may concern:*

Be it known that I, ALEXANDER EUSTON, a citizen of the United States, residing at the city of St. Louis, State of Missouri, have invented certain new and useful Improvements in Apparatus for Treating Oleaginous Seeds, of which the following is a full, clear, and exact description, such as will enable others skilled in the art to which it appertains to make and use the same, reference being had to the accompanying drawings, forming part of this specification, in which—

Figure 1 is a conventional illustration of a system of plant used in practicing my invention. Fig. 2 is a cross-sectional view on line 2 2, Fig. 1; and Fig. 3 is a similar view, in side elevation, of the conveyers.

This invention relates to a new and useful improvement in apparatus for treating oleaginous seeds for the production of oil and oil-cake, especially linseed-oil and linseed-cake, the object being to construct and so arrange the apparatus that the seeds are practically handled entirely by machinery from the time they are crushed until they are formed into the green cake and ready for introduction into the hydraulic presses, where the oil is extracted therefrom and the final cake is made. Of course it will be understood that after leaving this "final press," as I have called it, the edges of the cake are trimmed ready for shipment, and preparatory to consumption these cakes may be ground, as is frequently done.

In Patent No. 616,228, granted to me December 20, 1898, is shown an apparatus which practically answers the purposes for which my present invention is designed to accomplish, with this exception, that an open conveyer-belt is employed to conduct the dried seeds to the tempering-kettle, and while on this open conveyer considerable heat is lost and to a certain extent the preparatory stage of drying is modified by the absorption of moisture from the air by the meal contents of the seeds to an irregular degree.

My present invention contemplates the provision of inclosures for the seeds from the time they are crushed until they are placed in the final press for the extraction of oil therefrom.

In the drawings, A indicates a conveyer into which seeds are placed to be fed to the crushing-mills, (indicated by the letter B.) This conveyer, which is an ordinary screw conveyer, supplies these mills, of which there may be any desired number, depending upon the capacity of the apparatus which subsequently treats the seeds, and has its rear end open, for the obvious purpose of preventing the conveyer from choking and relieving the crushing-mills from the overflow. These crushing-mills B operate substantially the same as described in Patent No. 594,390, granted to me November 13, 1897.

When the seeds are crushed, they are discharged into a trough C, in which trough is arranged a screw conveyer D for carrying the seeds into a drying apparatus, (marked E.) The details of this drying apparatus E are shown in Patent No. 616,228, granted to me December 20, 1898, before referred to, and the drying apparatus E in my present application operates in substantially the same way and accomplishes the same purpose as that shown and described in said patent. Instead of delivering the dried crushed seeds into an ordinary conveyer from this drying apparatus, as illustrated in said last-named patent, however, I now propose and my present invention particularly relates to the discharge of said dried crushed seeds into a closed trough, (marked F in the drawings,) which trough, as shown in Fig. 2, is steam-jacketed for the purpose of maintaining a temperature therein higher than that of the external atmosphere. In this closed trough is arranged a screw conveyer G, whose spiral is not continuous, but is broken to form a series of interrupted angled flights g, which operate to feed the seeds onward by an intermittent motion, at the same time agitating said seeds by turning them over and constantly forcing them up into the open space above, where they are subjected to a preparatory treatment of steam. In actual practice trough F is not designed to be filled entirely with seeds; but for the purpose of illustration I will say that the seeds occupy substantially the lower half of the trough, the angled flights tossing the seeds up into the space above, permitting them to fall again until caught by the next flight, and so on. This space in trough F is designed to be filled with low-pressure steam entering through a pipe or pipes H introduced into the upper portion of the trough near the drying apparatus E and so inclined as to give a direction to the entering steam, which is toward the rear or discharge end of trough F. As the seeds are tossed into this steam-space they are agitated and turned to such an extent that caking is practically prohibited and all sides of the seeds are subjected to this steam treatment. The moisture in the steam is absorbed or taken up by the meal contents of the crushed seeds, which are uniformly dried by the drying apparatus E in sufficient or desired quantity, and as the supply of steam to trough F is regulated it follows that a uniform percentage of moisture is absorbed by all of the crushed seeds and their meal contents, the excess steam in trough F being conducted off through a pipe H', located at the discharge end of said trough. After being treated in trough F the crushed and now moistened or tempered seeds are discharged at the rear end thereof through an opening $f$ into a trough I, in which latter trough is arranged a screw conveyer J, which for the purpose of simplification and saving of space is geared to the conveyer G, but which rotates in an opposite direction from said conveyer G. Trough I is provided with openings $i$ in its bottom controlled by slides $i'$, which openings discharge the seeds from said trough into kettles K, where the temperature can be maintained, the volume of seeds entering said kettles being regulated by the individual slides $i'$. The end of trough I opposite that at which the seeds are introduced is open to a discharge-chute L for the purpose of conducting off the overflow, which can be again introduced into the tempering-kettles manually or otherwise as the seeds are ready to be initially pressed into the green cake. By regulating the amount of seeds fed to the crushing-mills there is no necessity for the provision of these overflow-conduits at any place in the system; but for precautionary reasons they are introduced wherever they are deemed desirable.

The kettles K may be substantially the same as those shown and described in Patent No. 587,802, granted to me August 10, 1897, although from actual experience I have found that the steam-spray pipes may be omitted therefrom as used here, but agitators should be employed for the purpose of preventing caking of the seeds in these kettles. The kettles therefore may be said to be reservoirs into which the volume of seeds is received in readiness to supply the tempered meal to the molding-machines, the preferred form of which molding apparatus is shown and described in Patent No. 616,229, granted to me December 20, 1898. This apparatus presses the seeds into cake form, known as "green" cake, which are wrapped in cloth for the purpose of excluding the atmosphere and preserving the shape and temperature of the cake when passed to the hydraulic press, where it is subjected to pressure for the extraction of the oil therefrom.

What I claim is—

1. The combination with a plurality of crushing-mills, of a drier for receiving the crushed seeds from said crushing-mill, a steam-jacketed trough into which the crushed seeds are discharged from said drier, an interrupted screw conveyer in said trough, and a steam-pipe leading into said trough; substantially as described.

2. The combination with a plurality of crushing-mills, of a drier for receiving the crushed seeds from said crushing-mill, a steam-jacketed trough in which the crushed seeds are discharged from said drier, a steam-pipe nozzle entering said trough at one end, a screw conveyer arranged in said trough, which is interrupted to form angled flights, a second trough for receiving the seeds from said first-mentioned trough, a screw conveyer in said second trough, and reservoirs for receiving the seeds from said second trough; substantially as described.

3. The combination with a conveyer A of a plurality of crushing-mills B, which are supplied by said conveyer, a trough C, arranged under said crushing-mills, and containing a conveyer D, a drier E for receiving the seeds from trough C, a steam-jacketed trough F, for receiving the seeds from said drier, a screw conveyer G, whose convolutions are interrupted to form angled flights $g$, a steam-nozzle H entering into trough G at one end, a trough I for receiving the seeds from the discharge end of trough G, a screw conveyer J, in trough I, and reservoirs or tempering-kettles K, into which the seeds are discharged from trough I; substantially as described.

In testimony whereof I hereunto affix my signature, in the presence of two witnesses, this 21st day of January, 1899.

ALEXANDER EUSTON.

Witnesses:
F. R. CORNWALL,
A. S. GRAY.